US008423827B2

(12) United States Patent
Berriss et al.

(10) Patent No.: US 8,423,827 B2
(45) Date of Patent: Apr. 16, 2013

(54) TOPOLOGY BASED CORRELATION OF THRESHOLD CROSSING ALARMS

(75) Inventors: William P. Berriss, London (GB); Matthew Duggan, Surrey (GB); Daniel Martin, Pawling, NY (US); David J. Pennell, Sr., Dripping Springs, TX (US)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 12/647,706

(22) Filed: Dec. 28, 2009

(65) Prior Publication Data

US 2011/0161741 A1 Jun. 30, 2011

(51) Int. Cl.
*G06F 11/00* (2006.01)

(52) U.S. Cl.
USPC ............ 714/26; 714/25; 714/4.1; 714/40; 370/276; 370/229

(58) Field of Classification Search ............ 714/26, 714/25, 4.1, 40; 370/276, 229
See application file for complete search history.

(56) References Cited

U.S. PATENT DOCUMENTS

| 5,309,448 | A | | 5/1994 | Bouloutas et al. |
|---|---|---|---|---|
| 5,737,319 | A | * | 4/1998 | Croslin et al. ............... 370/255 |
| 5,832,196 | A | * | 11/1998 | Croslin et al. ............... 714/4.3 |
| 5,946,373 | A | * | 8/1999 | Harris ...................... 379/14.01 |
| 5,949,759 | A | * | 9/1999 | Cretegny et al. ............ 370/250 |
| 6,012,152 | A | * | 1/2000 | Douik et al. .................. 714/26 |
| 6,046,988 | A | * | 4/2000 | Schenkel et al. ............. 370/254 |
| 6,072,777 | A | | 6/2000 | Bencheck et al. |
| 6,253,339 | B1 | * | 6/2001 | Tse et al. .................... 714/47.1 |
| 6,263,455 | B1 | * | 7/2001 | Bannister ....................... 714/25 |
| 6,304,549 | B1 | * | 10/2001 | Srinivasan et al. ........... 370/230 |
| 6,414,940 | B1 | * | 7/2002 | Shah et al. ................... 370/242 |
| 6,601,185 | B1 | * | 7/2003 | Bass et al. ................... 714/4.12 |
| 6,604,208 | B1 | * | 8/2003 | Gosselin et al. ............ 714/4.12 |
| 6,665,275 | B1 | * | 12/2003 | Davy et al. ................... 370/282 |
| 6,701,459 | B2 | | 3/2004 | Ramanathan et al. |
| 6,707,795 | B1 | | 3/2004 | Noorhosseini et al. |
| 6,862,698 | B1 | * | 3/2005 | Shyu ............................. 714/57 |
| 7,043,661 | B2 | | 5/2006 | Valadarsky et al. |
| 7,103,807 | B2 | | 9/2006 | Bosa et al. |
| 7,197,546 | B1 | | 3/2007 | Bagga et al. |
| 7,409,676 | B2 | * | 8/2008 | Agarwal et al. ............. 717/120 |
| 7,551,560 | B1 | * | 6/2009 | Duong-van et al. ......... 370/232 |

(Continued)

OTHER PUBLICATIONS

Gruschke, "Integrated Event Management: Event Correlation Using Dependency Graphs", DSOM'98, 1998, pp. 1-12 http://www.nm.ifi.lmu.de/pub/Publikationen/grus98a/PDF-Version/grus98a.pdf.

(Continued)

*Primary Examiner* — Loan L. T. Truong
(74) *Attorney, Agent, or Firm* — Yee & Associates, P.C.; Jeffrey S. LaBaw

(57) ABSTRACT

Method, apparatus and computer program product for correlating performance events in a data processing system. A first event is received at one of a first device and a second device of the data processing system, and a second event is received at one of the first device and the second device. A type of a connection between the first device and the second device is identified to form an identified type of connection, and a relationship between the first event and the second event is determined based on the identified type of connection between the first device and the second device.

13 Claims, 4 Drawing Sheets

U.S. PATENT DOCUMENTS

| | | | |
|---|---|---|---|
| 7,908,359 B1* | 3/2011 | Soph ............................ | 709/224 |
| 7,974,224 B2* | 7/2011 | Tillet et al. .................... | 370/296 |
| 8,028,088 B2* | 9/2011 | Visser ........................... | 709/238 |
| 8,028,199 B1* | 9/2011 | Guruprasad et al. ............ | 714/43 |
| 8,032,796 B2* | 10/2011 | Ozaki et al. .................... | 714/43 |
| 2001/0013107 A1* | 8/2001 | Lewis ............................ | 714/47 |
| 2001/0014886 A1* | 8/2001 | Ross et al. ..................... | 706/45 |
| 2002/0062465 A1* | 5/2002 | Goto ............................. | 714/724 |
| 2004/0168100 A1* | 8/2004 | Thottan et al. .................. | 714/4 |
| 2005/0099953 A1* | 5/2005 | MacDonald .................. | 370/241 |
| 2005/0108444 A1* | 5/2005 | Flauaus et al. ................. | 710/15 |
| 2005/0222810 A1* | 10/2005 | Buford et al. ................. | 702/183 |
| 2006/0036906 A1* | 2/2006 | Luciani et al. ................. | 714/11 |
| 2006/0092850 A1* | 5/2006 | Neidhardt et al. ............. | 370/252 |
| 2006/0095564 A1* | 5/2006 | Gissel et al. .................. | 709/224 |
| 2006/0190594 A1* | 8/2006 | Jorgenson et al. ............. | 709/224 |
| 2006/0262728 A1* | 11/2006 | Addeo et al. .................. | 370/248 |
| 2006/0280133 A1* | 12/2006 | Nomura et al. ................ | 370/276 |
| 2007/0079266 A1* | 4/2007 | Devineni et al. ................ | 716/5 |
| 2007/0177523 A1* | 8/2007 | Nagami et al. ................ | 370/252 |
| 2007/0183349 A1* | 8/2007 | Pannell et al. ................ | 370/276 |
| 2008/0089249 A1* | 4/2008 | Young et al. .................. | 370/276 |
| 2008/0091803 A1* | 4/2008 | Liu ............................... | 709/223 |
| 2008/0114874 A1* | 5/2008 | Meir et al. ..................... | 709/224 |
| 2008/0198753 A1* | 8/2008 | Choudhury et al. .......... | 370/242 |
| 2008/0288821 A1* | 11/2008 | Aaron ............................ | 714/26 |
| 2008/0310417 A1* | 12/2008 | Friskney et al. .............. | 370/392 |
| 2009/0262650 A1* | 10/2009 | Shaikh et al. ................ | 370/242 |
| 2009/0285106 A1* | 11/2009 | Bernard et al. ................ | 370/242 |
| 2010/0100775 A1* | 4/2010 | Slutsman et al. ............. | 714/47 |
| 2010/0157812 A1* | 6/2010 | Blocker et al. ................ | 370/242 |
| 2011/0035628 A1* | 2/2011 | Martin et al. .................. | 714/37 |
| 2011/0047262 A1* | 2/2011 | Martin et al. .................. | 709/224 |
| 2011/0142078 A1* | 6/2011 | Wong et al. ................... | 370/503 |

OTHER PUBLICATIONS

Gurer et al., "An Artificial Intelligence Approach to Network Fault Management," pp. 1-10, SRI International, retrieved Dec. 2009 http://www.sce.carleton.ca/netmanage/docs/An_AI_Approach.pdf.

* cited by examiner

FIG. 7A
702

FIRST EVENT/ALARM
* EGRESS UTILIZATION IS HIGH FOR PACKETS TRANSMITTED ON FIRST PORT
  OR
* HIGH COLLISIONS
  OR
* TRANSMISSION ERRORS ARE HIGH
  OR
* DISCARD OF PACKETS

FIG. 7B
704

SECOND EVENT/ALARM
* INGRESS UTILIZATION IS HIGH FOR PACKETS RECEIVED ON FIRST PORT
  OR
* HIGH PACKET ERROR
  OR
* TRANSMISSION ERRORS ARE HIGH
  OR
* CONGESTION

FIG. 7C
706

RELATIONSHIP
* HIGH EGRESS UTILIZATION
* ERROR WITH CONNECTING WIRE
* PORT CONGESTION
* HIGH TRANSMISSION ERRORS

TOPOLOGY BASED CORRELATION OF THRESHOLD CROSSING ALARMS

BACKGROUND

1. Field

The disclosure relates generally to performance management and more specifically to correlating performance events in a data processing system.

2. Description of the Related Art:

Performance management is playing an increasingly greater role in maintaining customer satisfaction. As a result, performance management systems have become "need to have" systems that are used in every day data processing system operations.

An important capability of a performance management system is to manage performance events such as threshold crossing alarms. Frequently, a single problem occurring in a data processing system may set off a plurality of threshold crossing alarms at different locations in the data processing system resulting in "event clutter." It would be desirable for a performance management system to be able to manage event clutter by correlating performance events that have a common or related cause.

SUMMARY

According to one illustrative embodiment, a method is provided for correlating performance events in a data processing system. A first event is received at one of a first device and a second device of the data processing system, and a second event is received at one of the first device and the second device. A type of a connection between the first device and the second device is identified to form an identified type of connection, and a relationship between the first event and the second event is determined based on the identified type of connection between the first device and the second device.

BRIEF DESCRIPTION OF THE SEVERAL VIEWS OF THE DRAWINGS

FIGS. 7A-7C depict various performance events and relationships, including types of a first event/alarm (element 702 of FIG. 7A), types of a second event/alarm (element 704 of FIG. 7B), and types of a relationship (element 706 of FIG. 7C).

DETAILED DESCRIPTION

Figure 1:
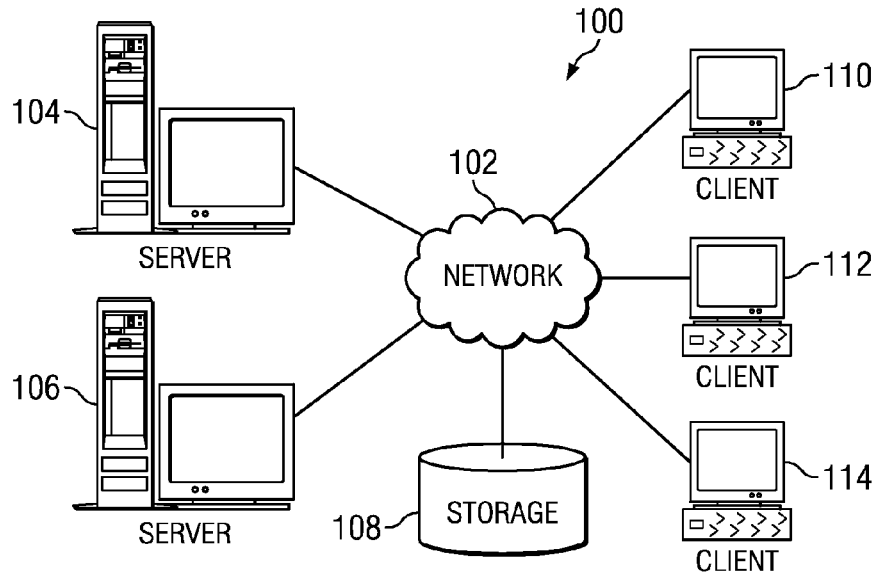
FIG. 1 depicts a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
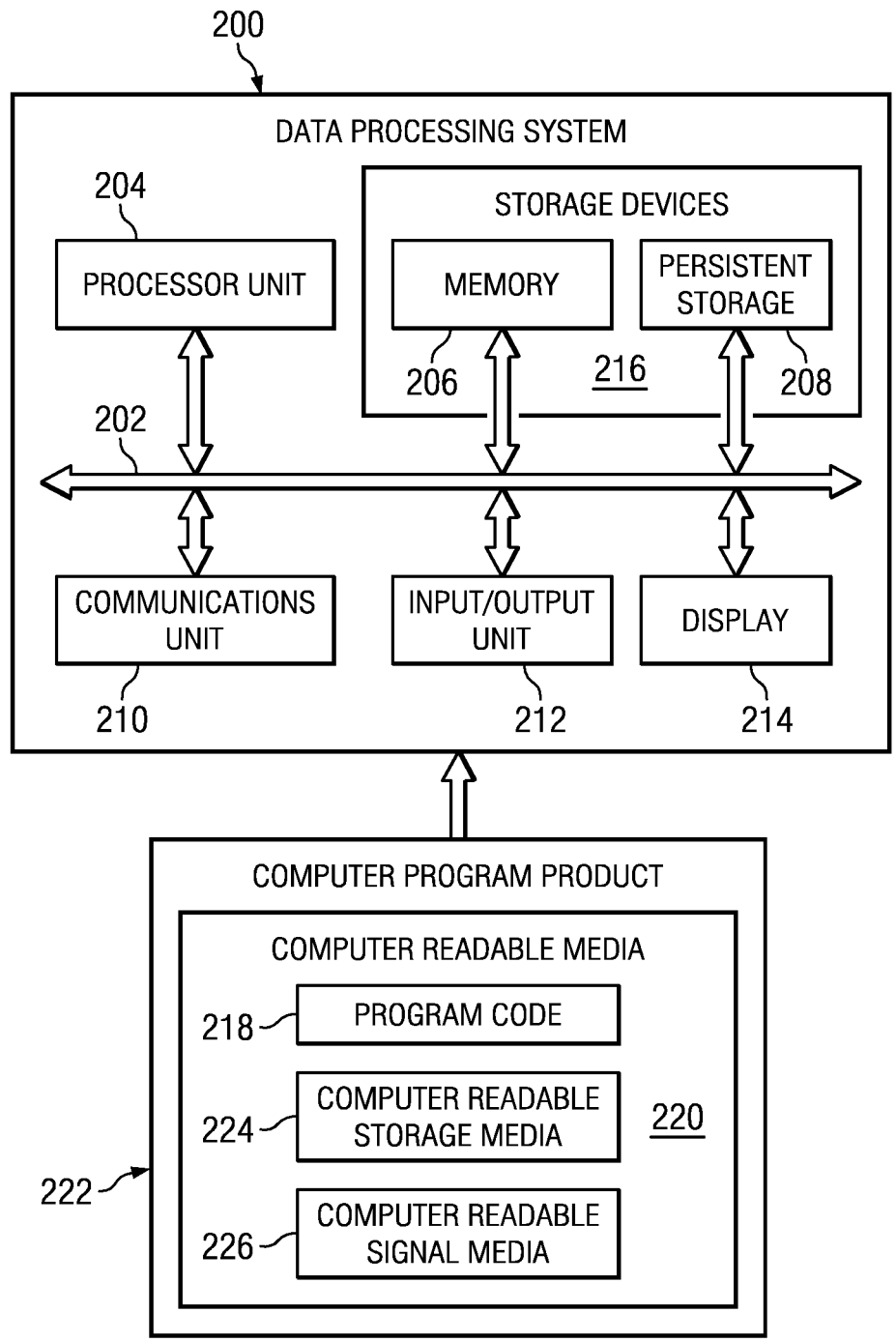
FIG. 2 is a block diagram of a data processing system in accordance with an illustrative embodiment.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides information, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory, or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code, in the different embodiments, may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
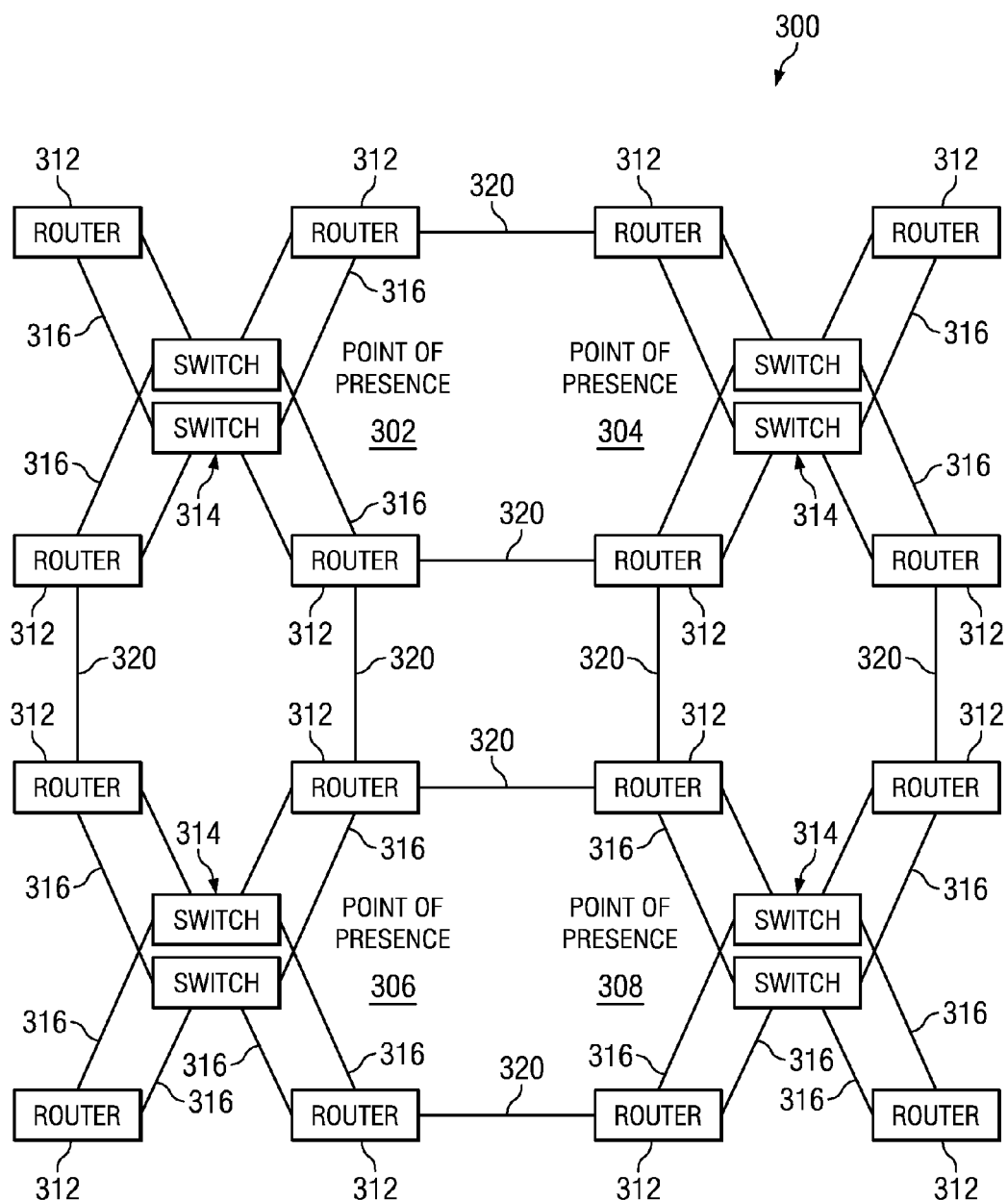
FIG. 3 is a block diagram of an Internet Service Provider (ISP) architecture in which illustrative embodiments may be implemented.

With reference now to FIG. 3, a block diagram of an Internet Service Provider (ISP) architecture is depicted to assist in explaining illustrative embodiments. The ISP architecture is generally designated by reference number 300, and includes a plurality of "Points of Presence" (POPs) 302, 304, 306 and 308. Each POP is a place where a number of customer connections come in and a number of connections go out to other POPs in the ISP architecture 300. Each POP 302-308 may include, in addition to other components not illustrated in FIG. 3, a plurality of routers 312, and a plurality of switches 314 interconnecting the plurality of routers via connections 316. In addition, each POP is connected to others of the POPs via connections (or links) 320 between routers 312 thereof to provide redundant connections (or links) from POP to POP.

In a data processing system, such as ISP architecture 300 in FIG. 3, it is important to manage performance events, for example, threshold crossing alarms, that may occur during use of the data processing system. Frequently, a single problem occurring in a data processing system may set off a plurality of threshold crossing alarms at different locations in the data processing system resulting in "event clutter." It would be desirable for a performance management system to be able to manage event clutter by correlating performance events that have a common or related cause.

Illustrative embodiments recognize that when devices in a data processing system are directly connected via ports of the same type and speed, everything that leaves one port arrives at the other port. Because of this symmetry, once the type of the connection that exists between the ports is known, it becomes possible to understand more about the nature of performance events that may be received about the ports on both sides of the connection. A set of rules can be built to show that given a kind of connection, the kind of events that occur provide information about the connection and/or about the device on either end of the connection.

Figure 4:
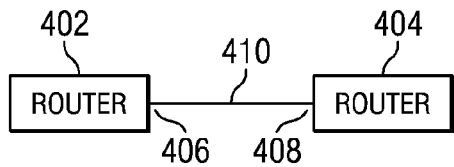
FIG. 4 is a block diagram of a portion of an ISP architecture to assist in explaining illustrative embodiments.

FIG. 4 is a block diagram of a portion of an ISP architecture, to assist in explaining illustrative embodiments In particular, FIG. 4 illustrates a first router 402 having a first port 406 and a second router 404 having a second port 408. The first router 402 is connected to the second router 404 by a connection 410 between the first port 406 and the second port 408. Routers 402 and 404 may, for example, be routers in ISP architecture 300 illustrated in FIG. 3, although it should be understood that it is not intended to limit the illustrative embodiments to any particular type of data processing system or architecture.

By utilizing known network discovery tools, for example, a TIVOLI OMNIBUS and Network Manager (TIVOLI and OMNIBUS are trademarks of IBM Corporation of Armonk, N.Y.), it can be determined that the two ports 406 and 408 are directly connected by the same wire 410. Let it be assumed that a threshold crossing alarm (TCA) is received for transmitted packets (TX packets) on port 406 indicating that egress utilization is high, and a TCA is received for received packets (RX packets) on port 408 indicating that ingress utilization is high. Since it has been established that routers 402 and 404 are directly connected by the same wire, it is also known that all packets that leave port 406 should arrive at port 408.

Accordingly, it can be concluded that the TCAs on ports 406 and 408 are really about the same high TX utilization on port 406 of device 402.

Thus, by utilizing knowledge about the topology of the two connected ports 406 and 408 (i.e., that they are directly connected by the same wire), one can correlate the performance events occurring at each port (i.e., that the TCA at each port indicates the same high TX utilization at port 406). In other words, the TCAs from ports 406 and 408 have the same or a related cause (high TX utilization at port 406) and the TCA from port 408 is, thus, made a child of the TCA from port 406.

As another example, consider that it has been identified that routers 402 and 404 in FIG. 4 are directly connected with the same speed Ethernet link. Let it also be assumed that a TCA is received from port 406 indicating that collisions are high, and a TCA is received from port 408 indicating that packet errors are high. Again, since it is known that the two ports are directly connected, it can be concluded that there is a duplex mismatch (a common problem in Ethernet in which two routers operate in different duplex modes—that is, one router operates in half duplex while the other router operates in full duplex). Thus, the TCAs occurring at ports 406 and 408 can be correlated, and the TCA from port 408 is again made a child of the TCA from port 406.

As yet a further example, consider that it has been identified that routers 402 and 404 are directly connected with the same speed link. Also, let it be assumed that a TCA is received from port 406 indicating that RX errors are high, and that a TCA is received from port 408 also indicating the RX errors are high. When errors are received on the inbound interfaces for both ports 406 and 408, it can be concluded that there is something wrong with wire 410 that connects ports 406 and 408. Thus, the TCA from port 408 is again made a child of the TCA from port 406.

As yet another example, consider again that it has been identified that routers 402 and 404 are directly connected with the same speed link. Let it also be assumed that a TCA is received either from port 406 indicating that RX errors are high or from port 408 indicating that RX errors are high. Since it is a very subtle physical problem that affects wire 410 in only one direction (discards on one side but not the other), it can be assumed that the TCA indicates a problem with the port itself (from which the RX errors are high).

Figure 5:
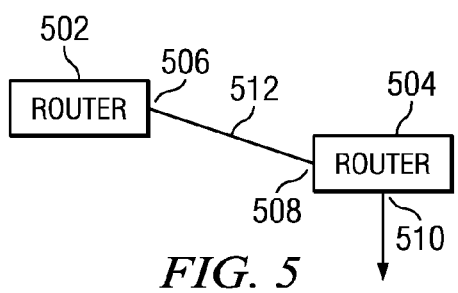
FIG. 5 is a block diagram of a portion of an ISP architecture to assist in explaining further illustrative embodiments.

FIG. 5 is a block diagram of a portion of an ISP architecture that illustrates two connected devices to assist in explaining a further illustrative embodiment. In particular, FIG. 5 illustrates a first router 502 having a first port 506 and a second router 504 having a second port 508. The first and second routers 502 and 504 are directly connected to one another via a wire 512 connecting ports 506 and 508. As also shown in FIG. 5, router 504 includes at least one additional port 510. Consider that it has been identified that routers 502 and 504 are directly connected with the same speed link. Also, assume that a high RX utilization TCA has been received from port 510 of router 504, and that a discard TCA has been received from port 508 of router 504.

It is expected that received packets will be discarded if there is not sufficient buffer space to accommodate the packets. Since, ports 506 and 508 are the same speed, it is not expected that packets will be discarded on directly connected ports unless there is congestion on some egress port on the device. Therefore, for ports that are directly connected (ports 506 and 508), it should be possible to correlate the discard TCA on port 508 with other discard or error TCAs or buffer levels inside router 504 itself. In other words, for receive discards, since it is known that the two ports 506 and 508 are of equal speed and type, and are directly connected, it is known that the discards are caused by congestion on other ports of router 504, not by router 502 to which it is connected. Since it is also known that the congestion will be caused by an aggregate of traffic, even though the flows themselves are not known, all the inbound discards are related to high utilization on an outboard port if only a single outbound port (i.e., port 510) is suffering high utilization If many ports are reporting TCAs for high utilization, then it is likely that the problems can be related to multiple flows and the only way to drill down further is if it is known which flows are bound for which ports.

The above illustrative embodiments are examples only, and are not intended to be limiting, of ways in which topology knowledge about certain kinds of connected ports between devices can be used to correlate performance events. In general, for synchronously connected ports (connected ports in which data packets may be sent in both directions at the same time) topology knowledge about the kind of connection between the two ports enables correlation of performance events. This enables performance of devices and the ports connecting the devices to be monitored and managed.

Figure 6:
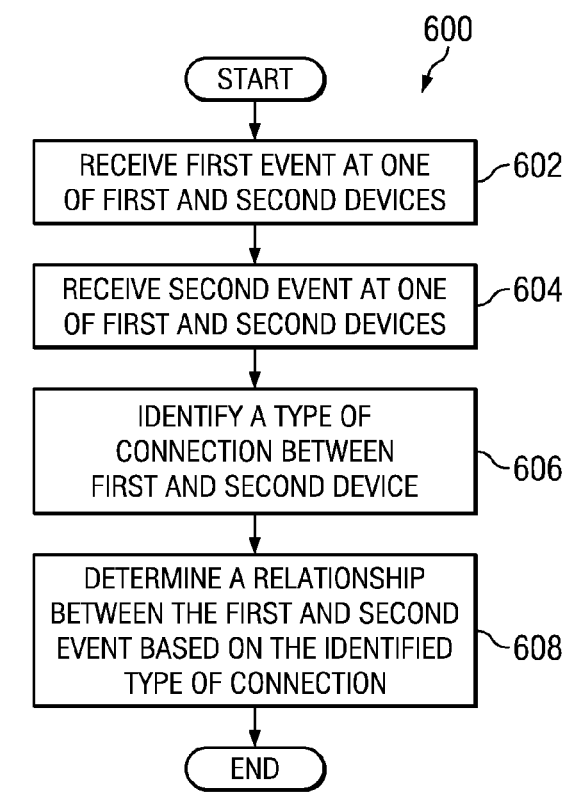
FIG. 6 is a flowchart of a process for correlating performance events in a data processing system in accordance with an illustrative embodiment.

FIG. 6 is a flowchart that illustrates a process for correlating performance events in a data processing system. In accordance with an illustrative embodiment. The method is generally designated by reference number 600, and begins by receiving a first event at one of a first device and a second device in the data processing system (Step 602). The first device and the second device may, for example, be routers in an ISP data processing system, and the first event may, for example, be a first alarm, such as a first threshold crossing alarm indicating that a threshold value has been crossed. A second event is received at one of the first device and the second device (Step 604). The second event may, for example, be a second alarm, such as a second threshold crossing alarm indicating that another threshold has been crossed. A type of a connection between the first device and the second device is identified to form an identified type of connection (Step 606). For example, the type of connection might be a same speed Ethernet link or another same speed link A relationship is then determined between the first event and the second event based on the identified type of connection between the first device and the second device (Step 608).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

FIG. 7A depicts at 702 certain characteristics of the first event/alarm that have previously been described herein. Such first event/alarm may indicate that egress utilization is high for packets transmitted on a port, high collisions on the first port, transmission errors are high, or a discard of packets from the second port of the second device. FIG. 7B depicts at 704 certain characteristics of the second event/alarm that have previously been described herein. Such second event/alarm may indicate that ingress utilization is high for packets received on the second port, a high packet error on the second port, transmission errors are high, or an absence of an alarm indicating high transmission errors on the other of the first port or second port. FIG. 7C depicts at 706 determined relationships that have previously been described. Such determined relationships may include high egress utilization, error with the wire connecting the ports, port congestion, or high transmission errors.

What is claimed is:

1. A method for correlating performance events in a data processing system, the method comprising:

receiving a first event at a first device of the data processing system;

receiving a second event at a second device of the data processing system, wherein the first event comprises a first alarm and the second event comprises a second alarm;

identifying a type of a connection between the first device and the second device to form an identified type of connection; and determining a relationship between the first event and the second event based on the identified type of connection between the first device and the second device, wherein the identified type of the connection comprises a direct wire connection between a first port of the first device and a second port of the second device, wherein the first alarm indicates that egress utilization is high for packets transmitted on the first port, wherein the second alarm indicates that ingress utilization is high for packets received on the second port, and wherein the determined relationship comprises that the first and second alarms each indicate a high egress utilization on the first port.

2. A method for correlating performance events in a data processing system, the method comprising:

receiving a first event at a first device of the data processing system;

receiving a second event at a second device of the data processing system, wherein the first event comprises a first alarm and the second event comprises a second alarm;

identifying a type of a connection between the first device and the second device to form an identified type of connection; and determining a relationship between the first event and the second event based on the identified type of connection between the first device and the second device, wherein the identified type of the connection comprises a direct same speed Ethernet link between a first port of the first device and a second port of the second device, wherein the first alarm indicates high collisions on the first port, wherein the second alarm indicates a high packet error on the second port, and wherein the determined relationship comprises a duplex mismatch between the first port and the second port.

3. A method for correlating performance events in a data processing system, the method comprising:
receiving a first event at a first device of the data processing system;
receiving a second event at a second device of the data processing system, wherein the first event comprises a first alarm and the second event comprises a second alarm;
identifying a type of a connection between the first device and the second device to form an identified type of connection; and
determining a relationship between the first event and the second event based on the identified type of connection between the first device and the second device, wherein the identified type of the connection comprises a direct same speed link connection, wherein the first alarm indicates that transmission errors are high, wherein the second alarm indicates that transmission errors are high, and wherein the determined relationship comprises that a wire connecting the first port and the second port has a problem.

4. A method for correlating performance events in a data processing system, the method comprising:
receiving a first event at a first device of the data processing system;
receiving a second event at a second device of the data processing system, wherein the first event comprises a first alarm and the second event comprises a second alarm;
identifying a type of a connection between the first device and the second device to form an identified type of connection; and
determining a relationship between the first event and the second event based on the identified type of connection between the first device and the second device, wherein the identified type of the connection comprises a direct same speed link connection, wherein the first alarm indicates a discard of packets from the second port of the second device, wherein the second alarm indicates congestion at a third port of the second device, and wherein the determined relationship comprises that the discard of packets is caused by the congestion at the third port.

5. A method for correlating performance events in a data processing system, the method comprising:
receiving a first event at a first device of the data processing system;
receiving a second event at a second device of the data processing system;
identifying a type of a connection between the first device and the second device to form an identified type of connection; and
determining a relationship between the first event and the second event based on the identified type of connection between the first device and the second device, wherein the identified type of the connection comprises a direct same speed link connection, wherein the first event is an alarm indicating high transmission errors on one of the first port or the second port, wherein the second event is an absence of an alarm indicating high transmission errors on the other of the first port or the second port, and wherein the determined relationship is that the one of the first port and the second port having high transmission errors has a problem.

6. The method of claim 1, wherein the first device comprises a first router and the second device comprises a second router.

7. A computer program product comprising a non-transitory computer recordable storage medium having computer usable program code stored thereon that is operable for correlating performance events when executed by a data processing system to perform the steps of claim 1.

8. A computer program product comprising a non-transitory computer recordable storage medium having computer usable program code stored thereon that is operable for correlating performance events when executed by a data processing system to perform the steps of claim 2.

9. A computer program product comprising a non-transitory computer recordable storage medium having computer usable program code stored thereon that is operable for correlating performance events when executed by a data processing system to perform the steps of claim 3.

10. A computer program product comprising a non-transitory computer recordable storage medium having computer usable program code stored thereon that is operable for correlating performance events when executed by a data processing system to perform the steps of claim 4.

11. A computer program product comprising a non-transitory computer recordable storage medium having computer usable program code stored thereon that is operable for correlating performance events when executed by a data processing system to perform the steps of claim 5.

12. An apparatus, comprising:
a memory storing instructions, and
at least one processing unit for executing the instructions for correlating performance events in a data processing system, the at least one processing unit executing the instructions to:
receive a first event at a first device of the data processing system;
receive a second event at a second device of the data processing system;
identify a type of a connection between the first device and the second device to form an identified type of connection; and
determine a relationship between the first event and the second event based on the identified type of connection between the first device and the second device, wherein the identified type of the connection comprises a direct same speed Ethernet link between a first port of the first device and a second port of the second device, wherein the first event comprises a first alarm indicating high collisions on the first port, wherein the second event comprises a second alarm indicating a high packet error on the second port, and wherein the determined relationship comprises a duplex mismatch between the first port and the second port.

13. An apparatus, comprising:
a memory storing instructions, and
at least one processing unit for executing the instructions for correlating performance events in a data processing system, the at least one processing unit executing the instructions to:
receive a first event at a first device of the data processing system;
receive a second event at a second device of the data processing system;
identify a type of a connection between the first device and the second device to form an identified type of connection; and determine a relationship between the first event and the second event based on the identified type of connection between the first device and the second device, wherein the identified type of the connection comprises a direct same speed link connection, wherein the first event comprises a first alarm indicating that transmission errors are high, wherein the second event comprises a second alarm indicating that transmission errors are high, and wherein the determined relationship comprises that a wire connecting the first port and the second port has a problem.

* * * * *